United States Patent [19]

Paluzzi

[11] Patent Number: 4,932,153
[45] Date of Patent: Jun. 12, 1990

[54] WEEDLESS FISH HOOK ASSEMBLY AND METHOD OF MAKING SAME

[76] Inventor: G. W. Paluzzi, 1200 Laurel Ave., Chesapeake, Va. 23325

[21] Appl. No.: 408,253

[22] Filed: Sep. 18, 1989

[51] Int. Cl.⁵ .............................................. A01K 83/00
[52] U.S. Cl. ................................................... 43/43.4
[58] Field of Search ................................. 43/43.2, 43.4

[56] References Cited

U.S. PATENT DOCUMENTS

| | | | |
|---|---|---|---|
| 2,185,507 | 1/1940 | Knapp | 43/43.2 |
| 2,473,564 | 6/1949 | Bergren | 43/43.2 |
| 2,589,435 | 3/1952 | Roeben | 43/43.4 |
| 3,169,299 | 2/1965 | Morin | 29/9 |
| 3,640,014 | 2/1972 | Gurka | 43/42.43 |
| 3,722,128 | 3/1973 | Tremblay | 43/42.1 |
| 4,796,378 | 1/1989 | Krueger et al. | 43/43.4 |

OTHER PUBLICATIONS

Miscellaneous Advertisements.

Primary Examiner—M. Jordan
Attorney, Agent, or Firm—Griffin, Branigan & Butler

[57] ABSTRACT

A weedless fish hook assembly (10), and a method of making the weedless fish hook assembly, involve an elongated shield (14) constructed of a flexible, semi-rigid and resilient tube (30) with a shank (20) of a fish hook passing through and being attached to an upper tubularly portion (34) of the shield near an upper end of the shank. A lower portion of the elongated shield comprises an elongated segment inside-out segment (38) of the tube which bows from the upper tubularly portion toward the hook of the hook member. A metallic hook member of said fish hook assembly passes through an opening in the lower portion of said shield at a penetration area such that the inside-out segment bows outwardly and downwardly toward the hook. The inside-out segment forms a groove in which the hook's spear end is positioned to thereby protect the hook spear end from snagging debris but which yields to the mouths of biting fish.

11 Claims, 3 Drawing Sheets

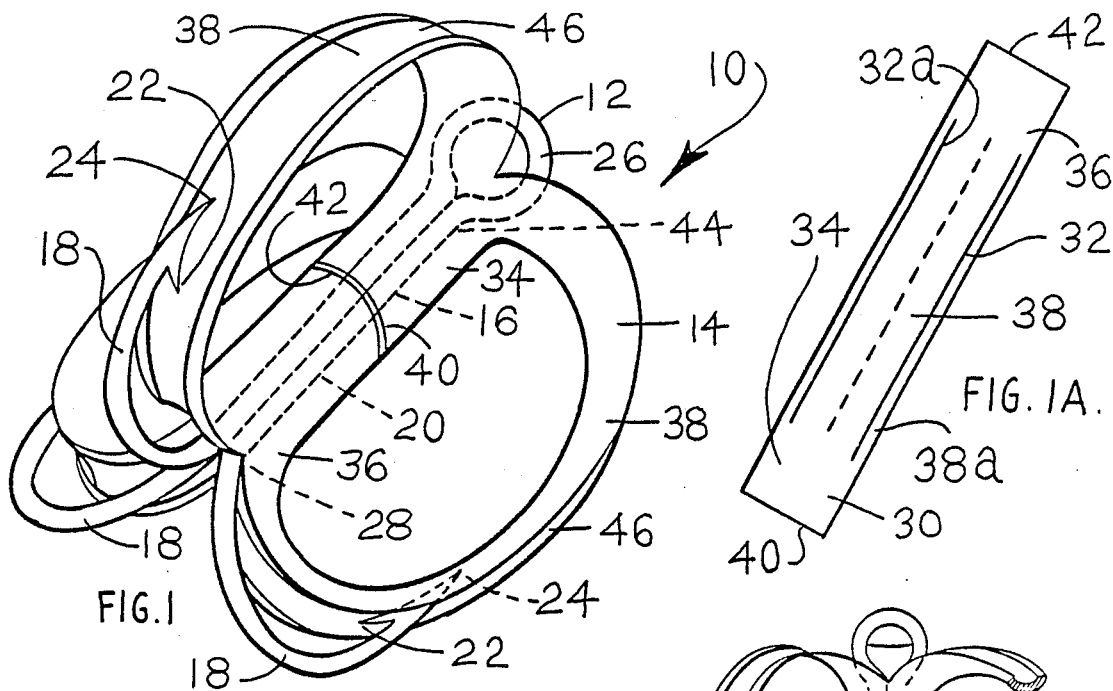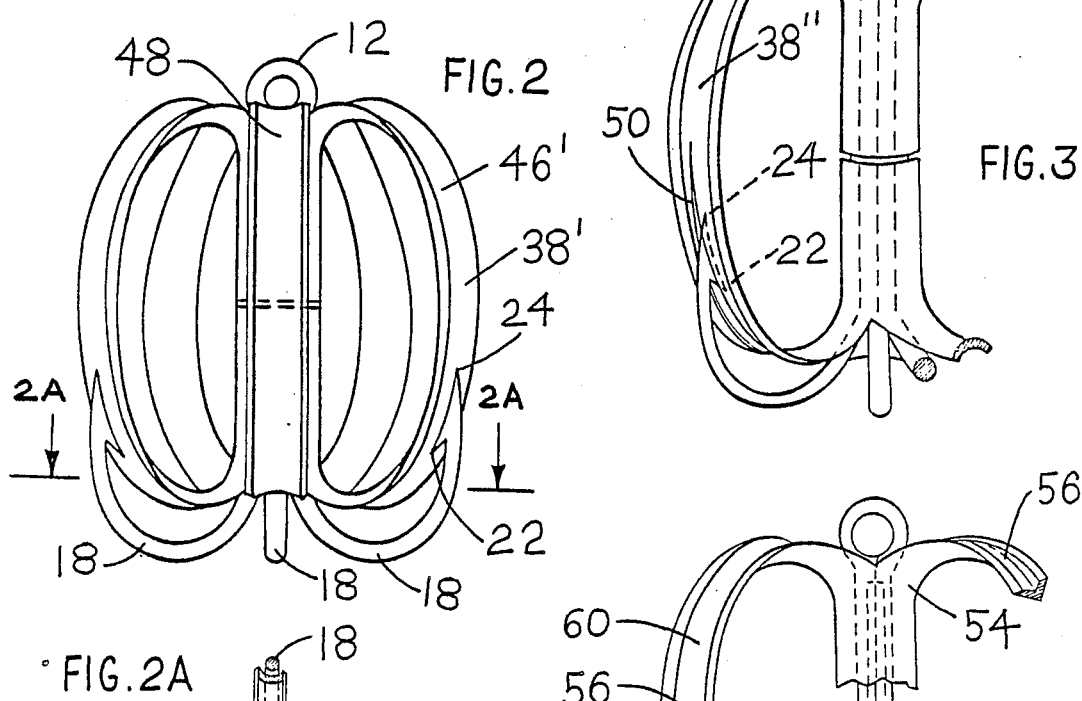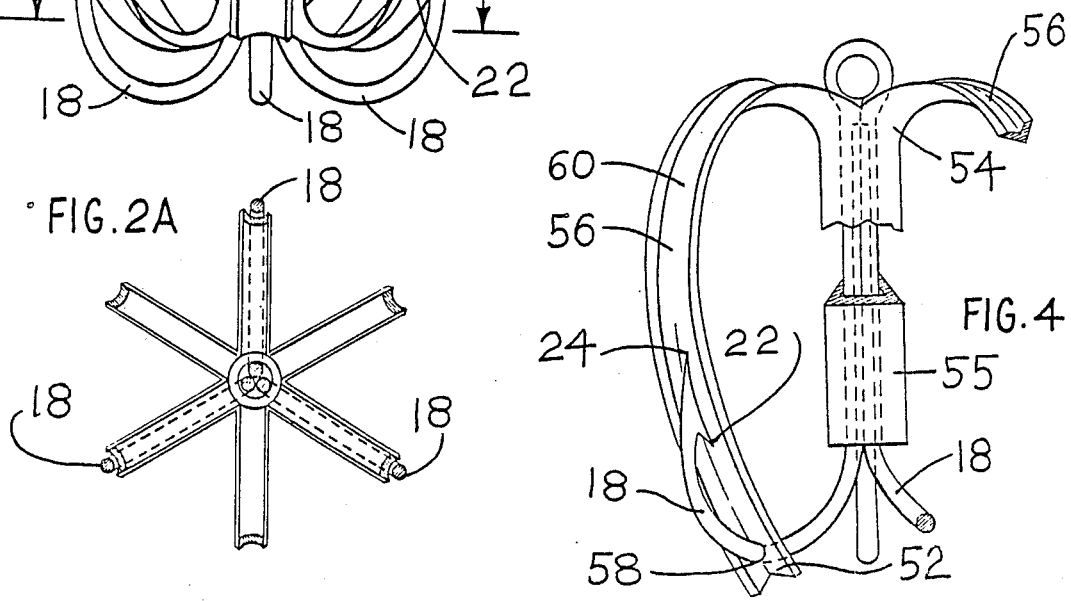

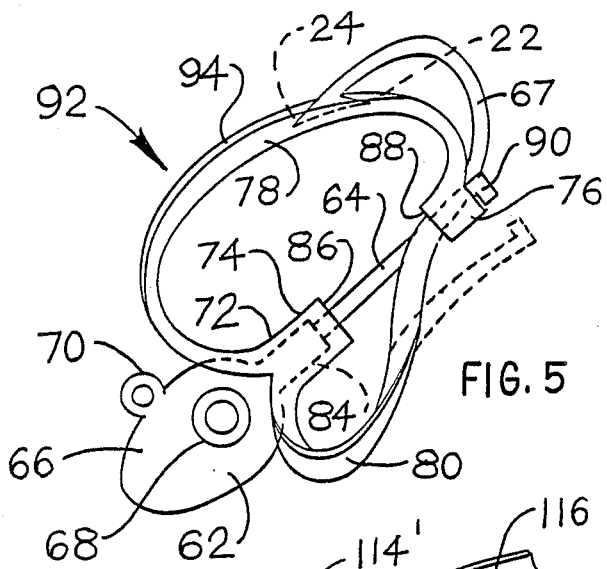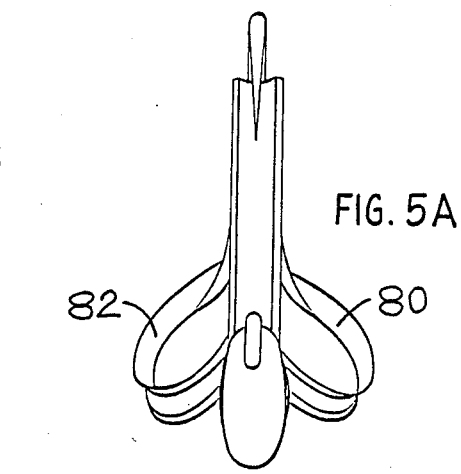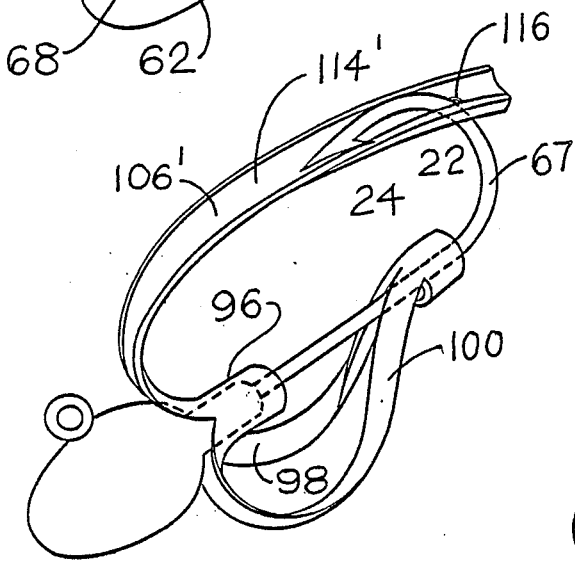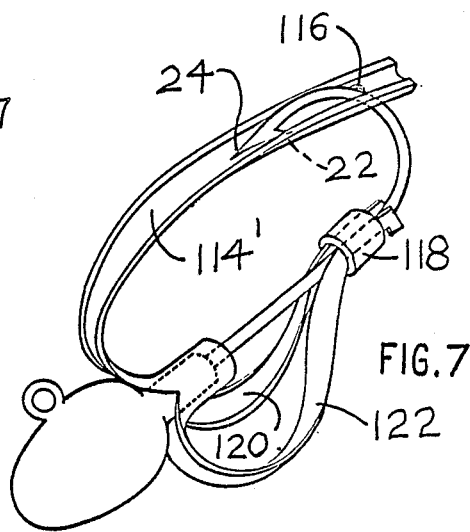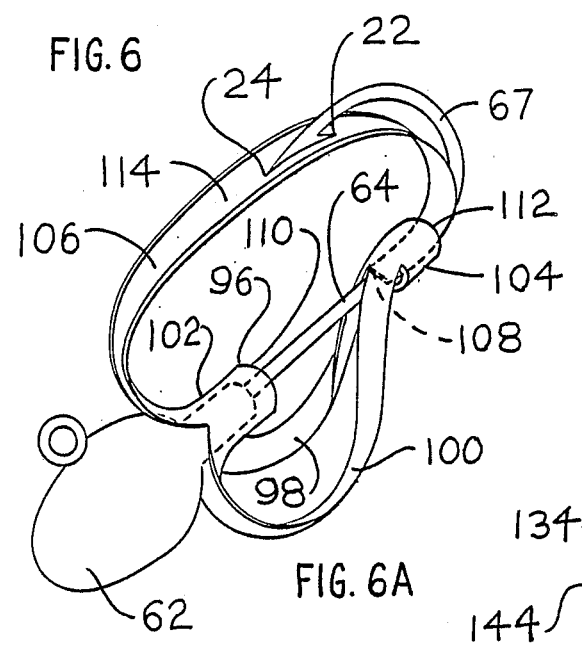

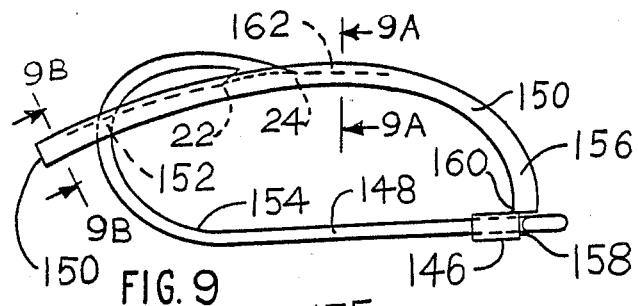
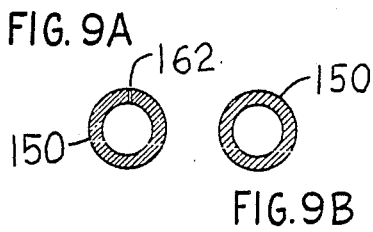
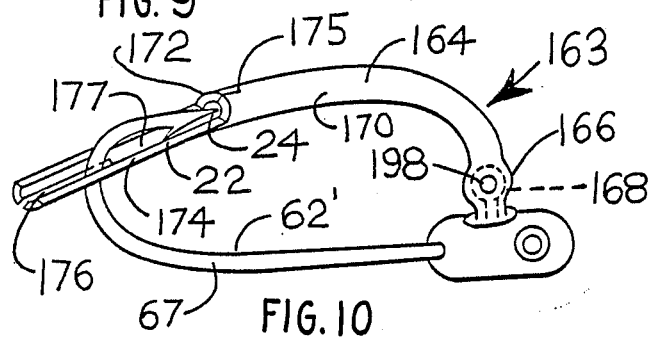
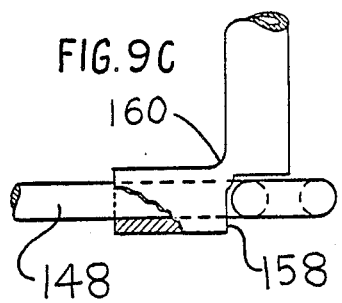
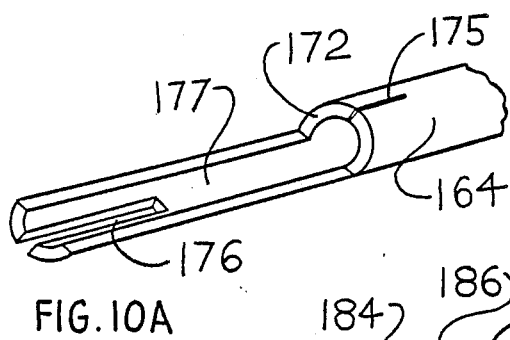
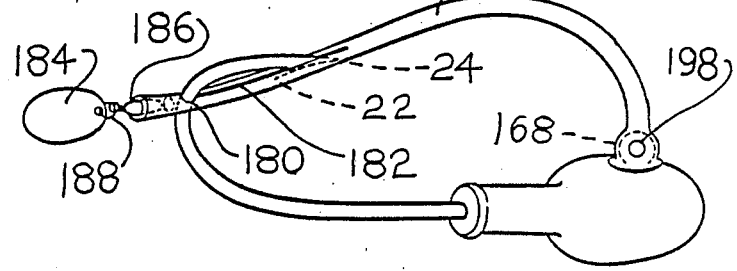
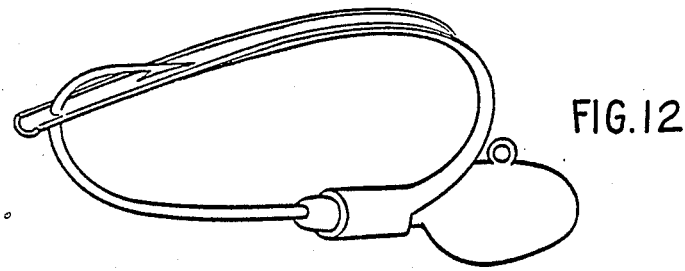
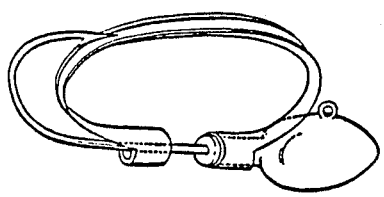
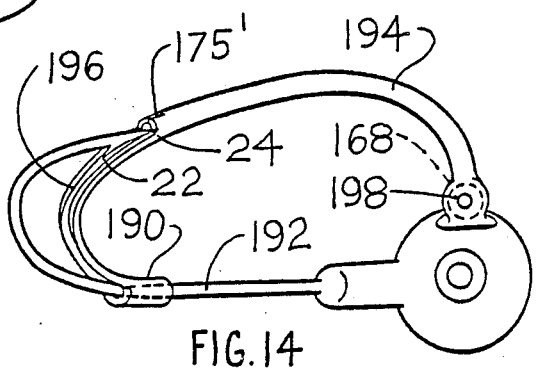

1

WEEDLESS FISH HOOK ASSEMBLY AND METHOD OF MAKING SAME

BACKGROUND OF THE INVENTION

This invention relates broadly to the art of fish hook assemblies, and more specifically to weedless fish hook assemblies of a type having flexible members attached to hook members to prevent the hook members from hooking debris.

There have been, and are, a number of weedless fish hook assemblies on the market. However, the structures of many such weedless fish hook assemblies adversely affect their built-in action. For example, U.S. Pat. No. 3,722,128 to Tremblay describes a weedless fish hook for a lure having a foam shield which can absorb water which thereby develops additional weight or drag. For this reason, it is an object of this invention to provide a weedless fish hook assembly which does not adversely affect the natural action of a fish hook assembly as it is pulled along in the water.

Yet another difficulty with many prior art weedless fish hook assemblies is that they only have one hook, such as is disclosed in U.S. Pat. No. 3,169,299 to Morin. The fish hook assembly of the Morin patent is currently being sold and has been reasonably successful. However, the consequences of snagging hooks is greatest when a fisherman uses an expensive lure, such as a plug. In this regard, if a plug is lost, it costs the fisherman much more than if only one hook is lost. Most expensive plugs have hook assemblies with multiple-hook members, such as treble hook members. For this reason, it is an object of this invention to provide a weedless hook assembly having a shield which works well with a multiple-hook member.

Yet another difficulty with many prior art weedless hook assemblies is that they are somewhat complex and difficult to manufacture. Therefore, it is an object of this invention to provide a weedless hook assembly which is relatively easy and inexpensive to manufacture and to provide a method for manufacturing such a weedless hook assembly.

Still another problem involved with weedless hook assemblies, and their method of manufacture, is that many of the shield mechanisms thereof not only tend to deflect debris from spear ends of hook members, but also tend to deflect mouths of fishes from the spear ends and therefore introduce a higher rate of failure for hooking fish. For this reason, it is an object of this invention to provide a shielded, weedless, hook assembly in which the shield thereof does not unduly deflect the mouths of fishes trying to bite bait on the hooks and therefore does not unduly affect the hooking incidences of these weedless hook assemblies.

SUMMARY OF THE INVENTION

According to principles of this invention, a weedless fish hook assembly and a method of manufacture thereof involve an elongated fish-hook shield constructed of a flexible, semi-rigid, and resilient tube being longitudinally slit along a portion of its length. The fish hook shield has upper and lower end portions, with the upper portion being tubularly shaped. A shank of a hook member passes through a bore of the upper tubular portion and is attached thereto near an upper end of the shank. An inside-out segment of the shield bows outwardly and downwardly from the upper tubular portion to a hook of the hook member. The hook member passes through an opening in a lower portion of the shield at the lower end of this segment of the shield and the segment is thereby supported at a penetration area to enclose a spear end of the hook in a groove in the inside-out segment of the fish hook shield to thereby protect the hook's spear end from snagging debris but yet yielding to mouths of biting fish. In one embodiment, there is a lower tubular portion at said lower end portion of said shield which is mounted at a lower end of the hook-member shank. In one embodiment, outside ends of the upper and lower end portions of the shield are directed toward one another. Many other embodiments are possible with these basic structures and methods of construction.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 1 is a perspective view of a weedless fish-hook assembly employing principles of this invention;

FIG. 1A is a side view of a tube from which a shield of the weedless fish-hook assembly of FIG. 1 is constructed during a stage in a process of such construction;

FIG. 2 is a side view of an alternate embodiment of the weedless fish-hook assembly of this invention;

FIG. 2A is a top view of the weedless fish-hook assembly of FIG. 2;

FIG. 3 is a segmented side perspective view of another alternate embodiment of the weedless fish-hook assembly of this invention;

FIG. 4 is a segmented side perspective view of an alternate embodiment of this invention with an upper tubular portion of a triangular resilient tube of an elongated shield of this invention being cut away so as to more clearly show its shape;

FIG. 5 is a side view of an alternate embodiment of this invention;

FIG. 5A is a top view of the embodiment shown in FIG. 5;

FIG. 6 is an isometric view of yet another alternate embodiment of this invention;

FIG. 6A is another alternate embodiment of this invention;

FIG. 7 is a perspective view of another alternate embodiment of this invention;

FIG. 8 is a perspective view of yet another alternate embodiment of this invention;

FIG. 9 is still another alternate embodiment of this invention;

FIG. 9A is a cross-section taken on line 9A—9A in FIG. 9;

FIG. 9B is a cross-section taken on line 9B—9B in FIG. 9;

FIG. 9C is a segmented enlargement of a portion of the FIG. 9 of the embodiment of this invention, being partially cutaway;

FIG. 10 is a perspective view of an alternate embodiment of the invention;

FIG. 10A is a perspective view of a lower end of the elongated shield of the FIG. 10 embodiment with a hook member thereof being removed for clarity;

FIG. 11 is a perspective view of an alternate embodiment of this invention;

FIG. 12 is a perspective view of an alternate embodiment of this invention;

FIG. 13 is another alternate embodiment of this invention; and

FIG. 14 is another alternate embodiment of this invention.

DETAILED DESCRIPTION OF THE INVENTION

Referring to FIG. 1, a weedless, or snag free, fishhook assembly 10 of this invention comprises a standard treble hook member 12 and an inventive elongated shield 14 of this invention. The treble hook 12 is formed of metal with all parts being rigidly connected to have an elongated shaft 16 bent at a hook end portion to form hooks 18 and a relatively straight shank 20. The hooks 18 are circumferentially separated by 120°, each being identical to the other. Each hook has a barb 22 near a hook spear end 24 thereof. The shank 20 has a line receiving eye 26 near an upper shank end, with the upper shank end being at the opposite end of the metallic shaft 16 from the hook spear ends 24. The shank 20 is attached to the hooks 18 at an upper portion of the hooks and at a lower portion of the shank, such an interfacing zone being indicated generally at 28 in FIG. 1.

The elongated shield 14 is constructed of a flexible, semi-rigid, and resilient, tube 30 (See FIG. 1A). In the embodiment of FIG. 1, the tube 30 is cut longitudinally with three slits 32 circumferentially spaced 120 from one another in a center portion thereof, but with upper and lower tubular end portions 34 and 36 being left unslit. These longitudinal slits 32 define three elongated segments 38 each being spaced 120° about the tube 30 from the adjacent segments. When practicing the method used to construct the elongated shield 14, each of the upper and lower tubular portions are rotated through the same slot 32a along with the segment 38a opposite the slot 32a so that the upper and lower tubular portions 34 and 36 are upside down, that is, their respective ends 40 and 42 are directed toward one another as is shown in FIG. 1, and the segments 38 are all turned inside-out. The shank 20 of the treble hook 12 is then inserted, eye 26 first, through bores in the lower and upper tubular portions 36 and 34. The upper tubular portion 34 is then fastened to the shank 20 near an upper end 44 thereof and the lower tubular portion 36 is attached to the shank 20 at the lower end 28 thereof, near the hooks 18. As can be seen in FIG. 1, each of the segments 38 is now turned inside out with inside surfaces thereof forming grooves 46 facing radially outwardly. By positioning the upper and lower tubular portions 34 and 36 properly on the shank 20, and by making the segments 38 a proper length, the hook spear ends 24 and their associated barbs 22 can be arranged in the grooves 46 of the bowed out elongated segments 38 as is shown in FIG. 1. In this embodiment, the upper and lower tubular portions 34 and 36 are adhered to the shank 20 so that they remain in fixed positions thereon. The elongated segments, being flexible and resilient, protect the hooks spear ends 24 and barbs 22 from engaging weeds as the weedless fish hook assembly 10 is pulled along in water, however, when a fish bites the hooks 18, the elongated segments 38 easily yield to the fish's mouth and thereby allow the fish to close his mouth on the hooks spear ends 24 so as to become hooked on the hooks 18.

Materials which work for the elongated shield 14 include Polyurethane, Neoprene, and synthetic rubber. Polyvinyl chloride becomes too brittle and stiff when cold and too soft and pliable when warm. In the preferred embodiment, polyurethane tubing 30 is used to construct the elongated shield 14. Solvents for bonding the bores of the upper and lower tubular portions 34 and 36 to the shank 20 of the shaft 16 include Dimethyformamide (DMF), Dimethylsulfoxide (SMSO), Tetrahydrofuran (THF), and Cyanoacrylate Ester.

With regard to the tubing 30 used to make the elongated shield 14, it is possible to double the segments 48 between the hooks 18 as well as the segments 38' with grooves 46' for receiving the hooks spear ends 24 and the barbs 22, as is shown in FIGS. 2 and 2A. When using more than three shield segments, for a treble hook for example, each segment is decreased in width in proportion to the number of segments. Beyond a suitable number, the segments become unstable. That is, they become too flexible and lose their recoverability. It then becomes necessary to use a thicker wall tubing 30 and/or a tubing of greater diameter than the shank 20 of the treble hook 12. Such a larger diameter tubing creates a void, or space, between the bores of the upper and lower tubular portions 34 and 36 which must be filled with a suitable filler. When it is necessary to use a filler, a filler sleeve can be put in place prior to assembling the shield on the shank of the hook. A metal sleeve, of lead, for example for a weighted fish hook, or plastic tubing whose inside diameter is the same as the fish hook shank, can be used to fill the void. It is also possible to use a shrinking tubing and then only shrink the upper and lower tubular portions.

Usually, the upper and lower tubular portions 34 and 36 of shields 14 are force pressed onto shanks 20. It is also possible to bond the butting ends 40 and 42 together; however, no bonding is needed if the force-press fit of the upper and lower tubular portions 34 and 36 are sufficiently tight to hold the shield in place.

The structure and method of construction of the FIG. 3 embodiment is quite close to the structure and method of construction of the FIG. 1 embodiment with the exception that the FIG. 3 embodiment includes an elongated slot 50 in each of the elongated segments 38 through which the hook spear end 24 and its barb 22 extends to protect them from snagging.

In the embodiment of FIG. 4, there is only an upper tubular portion 50, which is, as can be seen in FIG. 4, triangular in cross-section. A lower end portion 52 of the elongated shield 54 is comprised of ends of elongated segments 56 which are at an opposite end from the upper tubular portion 50 of the triangular tube from which the elongated shield 54 of the FIG. 4 embodiment is constructed. Rather than having a lower tubular portion, the elongated shield 54 has an opening 58 in the lower ends of each of the elongated segments 56 through each of which a hook spear end 24 of a hook 18 passes. A groove 60 in each of the elongated inside-out segments 56, which faces radially outwardly, is V-shaped because of the triangular shape of the tube from which the elongated shield 54 has been cut. The hook spear end 24 and barb 22 of each of the hooks 18 is positioned in the V-shaped groove 60 of its respective elongated segment 56. An interesting feature of this embodiment of the invention involves the hole 58. If this hole is punched out and sufficiently large, then free movement between each of the elongated segments 56 and its respective hook 18 is allowed and the position of the segment 56 on the hook 18 is not adjustable. In this case, the segment naturally tries to move outwardly, radially, but is supported so that the hook spear end 24 and the barb 22 are in the groove 60. However, it is possible to make the hole 58 as a pilot pin hole so that there is a forced tight fit between the segment 56 and its respective hook 18. In this configuration, adjustment is allowed between the hook 18 and its respective elongated segment 56. Any new position to which the segment is placed relative to the hook will be maintained due to friction between these two elements. Thus, in this configuration, the position of the hook spear 24 and the barb 22 relative to its respective groove 60 can be adjusted.

The triangularly shaped tubing can be made from a special composition of polyurethane which would allow the shield segments 56 to be made narrower and therefore overcome drag. The V-shaped groove 60 channel to stay in place on the hook spear end 24 and the barb 22.

The FIG. 5 embodiment of this invention involves a single hook metal head jig 62 which includes a shank 64 and a hook 67 which have the same function and basic structure as the shank 20 and the hooks 18 of the FIG. 1 embodiment. Of course, the treble hook 12 of the FIG. 1 embodiment includes three hooks 18 while the single hook metal head jig 62 only includes one hook 67. However, the single hook metal head jig 62 differs significantly from those hook member already described in that it includes an enlarged jig head 66 with indicia 68 thereon to make the single hook metal head jig appear more like an insect and which includes a laterally directed fish line receiving eye 70. As can be seen in FIG. 5, the eye 70 extends at a 90° angle to an axis of elongation of shank 64. The jig head 66 is positioned at the upper end of the shank 64 and the hook 67 is positioned at the lower end of shank 64. An elongated shield 72 is constructed of a slit tube includes an upper tubular portion 74, a lower tubular portion 76, a single interconnecting segment 78 remaining as one piece with the upper and lower tubular portions 74 and 76, and free elongated segments 80 and 82. In construction of the elongated shield 72, a tube is slit along its length, with the slits being spaced 120° from one another, as is shown in FIG. 1A, so as to define the interconnecting segments 78 and the free elongated segments 80 and 82. The free elongates segments 80 and 82, however, are cut away from the lower tubular portions 76 while the interconnecting segment 78 is left connected with the lower tubular portion 76. The upper tubular portion 74 is then placed on the upper end of shank 74 at a shoulder 84 of the jig head 6 in an upside down orientation, that is, with its upper end 86 facing a lower end of the shank 64 and the hook 67. The interconnecting segment 78 is then bowed outwardly downwardly with the lower tubular portion 76 being threaded onto the hook 67 and finally mounted at the lower end of the shank 64 in an upside configuration, that is, with its lower end 88 facing the upper end 86 of the upper tubular portion 74. Each of the free elongated segments 80 and 82 is then twisted 180°, bowed back, and ends thereof 90 are inserted through the bore of the lower tubular portion 76, from its lower end 88, to be thereby held. In this embodiment, the free elongated segments 80 and 82 serve as stabilizer legs to hold a weedless fish hook assembly 92 of this embodiment in an attitude with the hook 67 facing upwardly. It can be seen in FIG. 5 that the free elongated segments 80 and 82 are notched on their ends so that they move positively engage the lower tubular portion 76.

In the FIGS. 5 and 5A embodiment, the hook's spear end 24 and the barb 22 are held in a radially, outwardly directed groove 94 of the inside-out interconnecting segment 78 in the same manner as the hook spear ends and barbs of hooks in the previously described embodiments are enclosed within grooves.

The embodiment of FIG. 6A also involves a single hook metal head jig 62, however, in this case, an elongated shield 96 has two interconnecting segments 98 and 100 which remain attached to an upper tubular portion 102 and a lower tubular portion 104. However, there is one free elongated segments whose lower end 108 is cut away from the lower tubular portion 104. To mount the elongated shield 96 on the single hook metal head jig 62, the upper tubular portion 102 is mounted upside down at an upper end of the shank 64, that is, with an end 110 thereof facing a lower end of the shank 64. On the other hand, the lower tubular portion 64 is mounted at a lower end of the shank 64 in a right side up configuration, that is, with its outer end 112 facing away from the end automatic twisting of the interconnecting segments 98 and 100 which serve as stabilizing legs. The free elongated segment 106 is bowed outwardly and downwardly, and inserted into a bore of the lower tubular portion 104 from the end 112 and fastened thereto. This properly positions a radially outwardly directed groove 114 in the inside-out free elongated segment 106 for receiving the hook spear end 24 and barb 22 to thereby protect them.

The embodiment of FIG. 6 is the same as the embodiment of FIG. 6A in every respect with the exception that a free elongated segment 106' thereof is not inserted into the lower tubular portion 104, but rather has a hole 116 therein through which the hook 67 extends. As in the case of the FIG. 4 embodiment, the hole 116 can be either a punched hole, or a tight pin hole, for respectively allowing free movement on the hook 67 or friction engagement therewith. In either case, however, the hook spear end 24 and barb 22 are enclosed in the groove 114' for protecting these elements from snagging debris.

The FIG. 7 embodiment differs from the FIG. 6 embodiment in that rather than remaining attached to a lower tubular portion 118 free elongated segments 120 and 122 are detached therefrom, twisted 180°, and inserted into the bore of a lower tubular portion 118 and fastened thereto. The free elongated segments 120 and 122 serve as stabilizing legs.

In the FIG. 8 embodiment, there is an upper tubular portion 124, but no lower tubular portion. The upper tubular portion 124 is mounted on a fish hook shank 126 in a right side up configuration, that is, with an upper end 128 thereof facing a fishing line eye 130, and with a free elongated segment 132 at the other end extending first downwardly toward a hook 134 and then bowing outwardly and upwardly toward the eye 130. The free elongated segment 132 is inserted then through a bore of the upper tubular potion 124 from the upper end 128 and finally has a tail 136 which extends downwardly beyond the hook 134. The free elongated segment 132 is formed by slitting a tube 30 of which the upper tubular portion 124 is a part and then cutting away from the upper tubular portion 124 at a circumferential cut line 138 all segments (not shown) except the free elongated segment 132. The inside-out free elongated segment forms a radially outwardly directed groove 140 in which the hook spear end 24 and barb 22 of the hook 134 are located for their protection. The tail 136 has an opening 142 therein through which the hook 134 passes and can also have a slit 144. Such a hole 142 and slit 144 provide stabilization for the overall weedless fish hook assembly of FIG. 8 and allow the tail 136 to naturally flow behind the hook 134.

In the FIG. 9 embodiment, there is an upper tubular portion 146 which is mounted at an upper end of a fish hook shank 148 while an elongated segment 150 bows outwardly and downwardly with a hole 152 therein through which a hook 154 passes. The elongated segment 150 is comprised of a complete tube, which, prior to the construction of an elongated shield 156 formed a single initial tube with the upper tubular portion 146. A circumferential cut 158 was made in the initial tube while leaving a portion 160 of the wall connected. The elongated segment 150 has a slit 162 along a portion thereof for housing the hook spear end 24 and the barb 22 of the hook 154.

In the weedless fish hook assembly 163 of FIG. 10, the fish hook is a single hook metal head jig 62'. An elongated shield 164 has an upper round tubular portion 166 which is mounted directly on an eye 168 of the single hook metal head jig 62'. An elongated segment 170 bowing outwardly and downwardly therefrom is tubular shaped until a point 172 where half of the tube is cut away to create a tail 174 which is formed of half a tube. A longitudinal slot 176 is cut in the tail 174 through which the hook 67 passes. The hook spear end 24 and its barb 22 are protected in a groove 177 in the tail 174. A slit 175 allows the hook spear end 24 to be placed in a bore of the elongated segment 170 but also allows the elongated segment 170 to yield to release the hook spear end 24 should a fish bite. The spear end 24 is positioned inside the tubular elongated segment 170 just below the slit 175. Thus, when a fish bites, the hook spear end 24 passes through the slit 175.

The embodiment of FIG. 11 is quite similar to the embodiment of FIGS. 10 and 10A except an elongated shield 178 has a hole 180 therethrough rather than a slot 176 and, rather than having half of the tube cut away to form a tail, there is merely a slit 182 in the tube in which the hook spear end 24 and the barb 22 can be placed for protection. A deflector/attractor spinner blade 184 is attached to a lower end of the elongated shield 178 by means of a two way swivel 186 and a split ring 188.

The embodiment of FIG. 12 is basically the same as the embodiment of FIG. 6, but without the interconnecting segments 98 and 100 and the lower tubular portion 104.

The embodiment of FIG. 13 is basically the same as the FIG. 5 embodiment, but without the free elongated segments 80 and 82 forming stabilizing legs.

The embodiment of FIG. 13 is basically the same as the FIG. 5 embodiment, but without the free elongated segments 80 and 82 forming stabilizing legs.

Finally, the embodiment of FIG. 14 is similar to the FIGS. 10 and 11 embodiments, but in this case there is a lower tubular portion 190 attached upside down to a lower end of a shank 192 with a portion of a tube forming the elongated shield 194 being cut away to expose a radially outwardly directed groove 196. The hook spear end 24 and the barb 22 lie in this groove 196 for protection from debris.

It should be understood that in the FIGS. 10, 11 and 14 embodiments, a hole 198 is punched through the tube forming the elongated shield to correspond with a hole in the eye 168 for allowing fishing line, or an attachment therefor to be inserted therethrough.

It will be understood by those of ordinary skill in the art, that the weedless fish hook assemblies of this invention, and a method of constructing the same, are extremely uncomplicated and economical. In this regard, the weedless fish hook assembly of this invention has a great deal of adaptability for a broad range of fishing lures and fish hooks. In this regard, some of the weedless fish hook assemblies of this invention, actually form fishing lures in and of themselves, especially when dressed with a pair of eyes or with a deflector/attractor spinner blade. The plastic tubes forming the elongated shields can be constructed of a crystal clear plastic material or a semi-transparent colored material to give them an insect appearance. The design of the weedless fish hook assemblies of this invention are extremely uncomplicated and allow easy and inexpensive manufacturing.

Yet an additional benefit of the weedless fish hook assemblies of this invention is that while they are virtually tangle free, they readily yield to allow mouths of fishes to be pierced by hook spear ends and barbs.

The weedless fish hook assembly for the treble hook of FIGS. 1 and 2 is particularly beneficial inasmuch as there does not appear to be a good prior art weedless fish hook assembly for a treble hook.

It should be understood that shielded treble weedless fish hook assemblies of this invention can be connected to a fishing lure by means of a split ring. The pivotal action provided by such a connection contributes to making the lure virtually snag free by deflecting forward thrust and direct pressure that could momentarily collapse the shield.

It will be understood by those of ordinary skill in the art, that although many embodiments of this invention have been presented herein, they are not exhaustive and that other embodiments could be made within the scope of the invention.

The embodiments of the invention in which an exclusive property or privilege are claimed are defined as follows:

We claim:

1. A weedless fish-hook assembly comprising:
a rigid, metallic hook member, said hook member comprising an elongated metallic shaft bent at a hook end portion, to form a hook, said hook including a barb near a spear end thereof, and said hook member being relatively straight to form a shank at a shank-end portion, said shank being shaped to form a line-receiving eye near an upper shank end, said upper shank end being opposite said hook spear end of said metallic shaft, an upper portion of said hook meeting with a lower end of said shank;
an elongated shield constructed of a flexible semi-rigid and resilient tube having good recovery properties, said tube defining a bore through an axis thereof and being longitudinally slit along its length, said elongated shield having upper and lower end portions there being an upper tubular portion at said upper end portion, said upper tubular portion being mounted on the shank of said hook member with said shank passing through a bore of said upper tubular portion and being attached thereto near said shank upper end, the lower end portion of said elongated shield including a segment defined by said elongated slit, said segment bowing outwardly and downwardly toward said hook, said metallic hook member passing through said lower portion of said elongated shield at a penetration area and being held thereto at said penetration area such that the segment of said elongated shield bowing outwardly and downwardly toward said hook forms a groove in which the hook spear end is positioned to thereby protect the hook spear end from snagging debris but yielding to the mouths of biting fish for thereby allowing biting fish to close their mouths on the hook's spear end and be thereby pierced and caught.

2. A weedless fish-hook assembly as in claim 1 wherein said lower portion of said elongated shield includes a lower tubular portion in the shape of a tube.

3. A weedless fish-hook assembly as in claim 2 wherein there are multiple hooks and multiple slits to form multiple segments of said elongated shield bowing outwardly and downwardly toward said hooks, there being at least one segment for each hook.

4. A weedless fish-hook assembly as in claim 3 wherein there are more slits and segments than there are hooks.

5. A weedless fish-hook assembly as in claim 2 wherein the upper and lower tubular portions are mounted on said shank in an upside down configuration, that is, with their upper and lower ends directed toward one another.

6. A weedless fish-hook assembly as in claim 2 wherein said upper tubular portion is mounted on said shank in an upside down orientation and said lower tubular portion is mounted on said shank in a right-side-up configuration with at least one segment at said lower tubular portion having been detached from a lower end of said tubular portion and reattached at an upper end thereof.

7. A weedless fish-hook assembly as in claim 2 wherein said penetration area through which said hook passes is in a lower part of a segment which bows outwardly to protect said hook spear and which has been detached from the lower tubular portion.

8. A weedless fish-hook assembly as in claim 7 wherein said detached segment has been reattached to the lower tubular portion at the opposite end of the lower tubular portion from which it was detached.

9. A weedless fish-hook assembly as in claim 1 wherein said eye extends lateral to the shank of said hook shaft and the upper tubular portion of said elongated shield is positioned on the eye with a hole through the upper tubular portion corresponding to a hole in the eye.

10. A method of constructing a weedless fishhook assembly of a type including a rigid metallic hook member, said hook member comprising an elongated metallic shaft bent at a hook end portion, to form a hook, said hook including a barb near a hook spear end thereof, and said hook member being relatively straight to form a shank at a shank-end portion, said shank being shaped to form a line-receiving eye near an upper shank end, said upper shank end being opposite said hook spear end of said metallic shaft, an upper portion of said hook meeting with a lower end of said shank, said method comprising the steps of:

forming an elongated shield by slitting a flexible, semi-rigid and resilient tube having good recovery properties longitudinally along a portion of its length, to form at least one segment therealong, there being at least an upper tubular portion at an upper end portion of said tube;

Mounting said upper tubular portion of said tube on the shank of said hook member with said shank passing through a bore of said upper tubular portion and being attached thereto near said shank upper end, bowing said at least one segment of said elongated shield outwardly and downwardly toward said hook, to a lower shield portion of said elongated shield, and passing said metallic hook member through an opening in said lower shield portion of said elongated shield at a penetration area while positioning the barb and hook spear end of said hook end in a radially outwardly directed groove in said segment to protect the hook spear end from snagging debris but for yielding to the mouths of biting fish for thereby allowing biting fish to close their mouths on the hook spear end.

11. A method as in claim 10 wherein said lower shield portion is made to include a lower tubular portion with said hook member passing therethrough and attached thereto.

* * * * *